(12) United States Patent
Prather et al.

(10) Patent No.: US 7,246,814 B2
(45) Date of Patent: Jul. 24, 2007

(54) MULTI-LEVEL HAND CART

(75) Inventors: James G. Prather, Yorba Linda, CA (US); Miguel Orozco, Lakewood, CA (US)

(73) Assignee: Mind Wurx, LLC, Yorba Linda, CA (US)

( * ) Notice: Subject to any disclaimer, the term of this patent is extended or adjusted under 35 U.S.C. 154(b) by 151 days.

(21) Appl. No.: 10/747,473

(22) Filed: Dec. 29, 2003

(65) Prior Publication Data

US 2005/0140118 A1  Jun. 30, 2005

(51) Int. Cl.
 *B62B 3/02* (2006.01)
(52) U.S. Cl. ............. 280/651; 280/DIG. 3; 280/33.995
(58) Field of Classification Search ....... 280/33.991–3, 280/33.995, DIG. 3, DIG. 4, 638, 639, 35, 280/651; 16/113.1; 38/103
See application file for complete search history.

(56) References Cited

U.S. PATENT DOCUMENTS

| | | | | |
|---|---|---|---|---|
| 2,901,262 A | * | 8/1959 | Berlin | 280/641 |
| 3,052,484 A | * | 9/1962 | Huffman et al. | 280/654 |
| 3,207,526 A | * | 9/1965 | Brodeck | 280/652 |
| 3,310,317 A | * | 3/1967 | Luff | 280/652 |
| 3,460,850 A | * | 8/1969 | Franklin | 280/47.2 |
| 3,514,123 A | * | 5/1970 | Injeski | 280/652 |
| 3,534,973 A | * | 10/1970 | Elliott | 280/33.992 |
| 4,334,620 A | * | 6/1982 | Block | 211/85.9 |
| 5,294,158 A | * | 3/1994 | Cheng | 280/641 |
| 5,417,490 A | * | 5/1995 | Hobbs et al. | 312/334.47 |
| 6,540,239 B2 | * | 4/2003 | Lee, Jr. | 280/33.993 |
| 6,655,763 B2 | * | 12/2003 | Judge et al. | 312/334.46 |
| 6,866,289 B2 | * | 3/2005 | Prather | 280/651 |
| 6,869,097 B2 | * | 3/2005 | Prather et al. | 280/651 |

* cited by examiner

*Primary Examiner*—Christopher P. Ellis
*Assistant Examiner*—Vaughn T. Coolman
(74) *Attorney, Agent, or Firm*—Terrell P. Lewis (57) ABSTRACT

A multi-level personal utility cart includes a frame including a vertical rear panel and a handle including latching structure on side portions of the handle, each latching structure being structurally engaged with a portion of the rear panel, a lower basket assembly carried by and pivotably attached to the frame, an upper basket assembly carried by and pivotably attached to the frame, where the upper and lower basket assemblies are pivotable in a direction toward the upper portion of the handle so that the upper and lower basket assemblies can be collapsed against a portion of the frame into a compact and substantially planar structure. The latching structure on the handle operatively cooperates with the rear panel to automatically lock the cart in an opened position. An access door to the lower basket assembly is provided.

21 Claims, 8 Drawing Sheets

MULTI-LEVEL HAND CART

BACKGROUND OF THE INVENTION

1. Field of the Invention

The present invention relates to hand or utility carts used by persons for transporting goods or personal belongings, and more particularly to collapsible hand or utility carts having multiple levels of containment for holding such goods or belongings.

2. Description of the Related Art

It is well known that shopping carts, of the kind typically found in supermarkets, department stores or other such stores where consumers select goods from in-store shelving and displays, have been used as vehicles for transporting merchandise purchased at those markets to and from the purchasers automobiles. It is also well-known that many purchasers, especially those persons who do not have automobiles or who reside in low-income areas, are prone to using the shopping carts for transporting their purchased goods to their residences or at the very least to their neighborhoods where they are able to unload their purchases and keep the carts in the ready for the next time it is necessary to return to those markets.

However, the removal of shopping carts from market premises by patrons or shoppers is a situation that has not been met with great favor, both in the industry and in the community, and a multitude of solutions for preventing the removal of such carts from the market premises have been devised. Among those currently most favored by the industry are electronically triggered devices which cause the wheels of the cart to lock up when the cart is pushed or otherwise moved past a pre-installed boundary, which typically takes the form of a buried electronically triggering cable disposed about the perimeter of the market's parking lot or premises.

Examples of such systems are embodied in U.S. Pat. Nos. 6,054,923 and 6,271,755 issued to Prather et al. Those patents disclose a shopping cart system that incorporates a disabling mechanism that renders the cart's swivel wheels inoperative upon actuation of a disabling signal from the cable. The '755 patent further teaches a shopping cart disabling system which, when triggered, makes available only a pair of wheels that enables movement of the cart, but only in a circular direction. The object of that invention is to make it impossible for a person to remove the cart from the store's premises by rolling it away.

Other theft thwarting systems have been developed and are well known, as that taught by U.S. Pat. No. 3,717,225 to Rashbaum, which discloses a piston rod and wheel lock device that includes a frame mounted actuator that locks one of the wheels of the cart upon actuation via a disabling signal, and various electronically actuated wheel locking devices, as exemplified in U.S. Pat. No. 5,315,290 to Moreno, U.S. Pat. No. 6,127,927 to Durban et al., U.S. Pat. No. 6,037,869 to Lace, and U.S. Pat. No. 6,125,972 to French et al.

One of the objectives of this invention to enable an alternative means of transporting purchased goods when shopping cart removal from a market's premises is thwarted. The present invention offers shoppers a user-propelled mobile device for transporting purchased goods from the market to their homes, and further to be able to take this mobile device back to the market for another shopping experience after which the same need to bring the purchased goods home can be again fulfilled. Concurrent with this aim, the invention embraces a scheme that rewards shoppers for using the mobile device of the invention for transporting purchased goods home instead of removing the market's shopping carts from the market's premises for that purpose.

Personal carts for transporting groceries or other personal items have been in use for some time. Typically, such personal carts have a single basket or container supported on or atop a wheeled base, and may additionally be able to be collapsed or otherwise folded to reduce the volume for storage when not in use.

Personal carts have also been developed which can be collapsed or folded so as to be easily storable. Examples of such carts are shown in U.S. Pat. No. 4,339,141 to Thiboutot and U.S. Pat. No. 4,185,848 to Holtz.

And in an effort to enable a shopper to transport increased amounts of goods from the store to the shopper's home or other destination, shopping carts with more than a single basket or container have been developed. For example, U.S. Pat. No. 6,126,181 to Ondrasik shows a conventional shopping cart frame on which are mounted stepped, offset, baskets, U.S. Pat. No. 4,047,724 to Shaffer shows a collapsible utility cart having a plurality of detachable baskets and stair-climbing capabilities, and U.S. Pat. No. D407,882 to Duchene teaches a shopping cart having a frame that is designed for supporting two removable baskets, one atop the other.

Applicants are also aware of the cart disclosed in U.S. Pat. No. 3,774,929 to Stanley which comprises a collapsible wheeled cart having a single basket on the top of which is carried an auxiliary carrying section which also is collapsible, but which is separate from and not permanently attached to the frame of the wheeled cart. Moreover, the upper basket and lower baskets do not close simultaneously with a single upward pivoting movement, as do the baskets in applicants' invention.

The foregoing carts are intended for use in the market and about the market premises. No personal carts having simultaneously collapsible baskets, with the exception of the carts disclosed in applicants' own published pending patent applications (USSN 20020167139 and USSN 20020083612), are known which are designed for use by the shopper outside of the market premises. Applicants' personal carts in the above referenced pending patent applications are multi-level collapsible carts wherein the upper and lower baskets are pivotably hinged to the frame of the cart, and can be collapsed together.

In applicants' prior collapsible carts as disclosed in the pending applications referred to above, the cart is secured in the fully erected position by a latching mechanism carried by the handle of the cart. However, it has been found that sometimes, when the loads are particularly heavy, these carts, like many other collapsible carts known in the art, have a tendency to collapse when they are pulled up stairs.

The preceding examples of carts and personal carts also have limitations as far as their carrying capabilities for purchased goods, and it is clear that there is a need for a personal cart that has significantly greater storage capacity, as for example one which has more than one storage compartment, where the contents of each storage compartment are each uniquely accessible and which will enable shoppers who have purchased their goods to transport their goods from the market to their home in a single trip without the use of motor vehicles. Such a cart must also be collapsible so that storage of the collapsed cart is facilitated as well. The present invention provides a solution to such a need for the shopper as well as the market.

There is also a need for such a cart to be sufficiently inexpensive to the shopper so that the shopper will be induced to acquire the cart in advance of shopping at the market. The present invention contemplates a plan or method for providing carts to the shoppers that benefits not only the shoppers, but the markets and vendors of the markets as well. This method contemplates the sale of the carts to the shoppers with subsequent rebates or discounts running to the shoppers for products or services offered by vendors of the markets as rewards to the shoppers for having purchased the carts.

In one aspect of the invention, there is provided a multi-level personal utility cart including a frame with a handle having a rearwardly positioned upper portion, side portions, and a forwardly extending lower portion, a first basket assembly pivotably supported to the frame, a second basket assembly disposed atop the first basket assembly and pivotably supported to the frame, where the first and second basket assemblies are simultaneously pivotable on the frame toward the handle upper portion so that the first and second basket assemblies can be collapsed against a portion of the frame into a compact and substantially planar structure.

In another aspect of the invention, there is provided a collapsible personal utility cart including upper and lower baskets pivotably mounted to a frame, in which the baskets are both pivotable from fully opened positions upwardly and toward the rear portion of the cart handle, and are both pivotably deployable from the fully collapsed position downwardly to a fully opened position, and further in which the cart includes a positive locking mechanism which secures the cart in an opened position.

In another aspect of the invention, a hand-propelled or pushed personal shopping cart is provided which includes multiple levels of storage within corresponding multiple, yet separate, storage chambers, with independent access to each chamber.

In another aspect of the invention, a personal shopping cart is provided which is collapsible, inexpensive to manufacture, and inexpensive to own as well.

In yet another aspect of the invention, the shopping cart is easily storable in its collapsed condition.

In still another aspect of the invention, the shopping cart will enable shoppers to own and possess a very affordable personal shopping cart with which they can take to their local shopping market, and into which they can load their purchased goods for subsequent check-out and then transport to their respective residences.

In still another aspect of the invention, a method for deterring theft of "conventional" shopping carts is provided in which shoppers are encouraged to use the "non-conventional" carts of the invention which are sold to the shoppers by markets, and discounts or rebates are made available to the shoppers by vendors who advertise and promote their goods and/or services available at the shopping markets.

Various objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a personal hand cart having multiple levels of storage compartments, while also being collapsible for storage.

Figure 1:
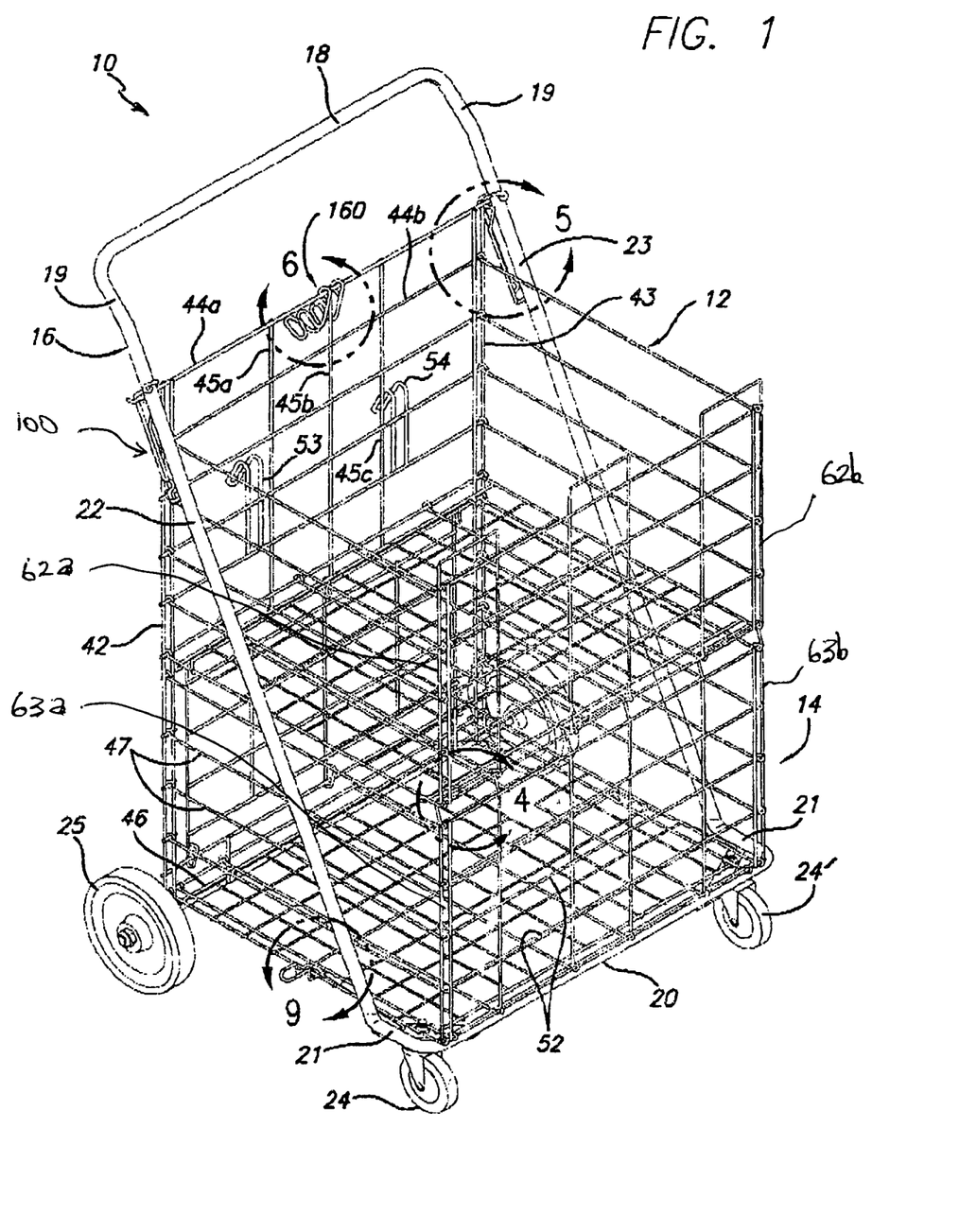
FIG. 1 is a front perspective view of the personal shopping cart of the present invention.
Figure 2:
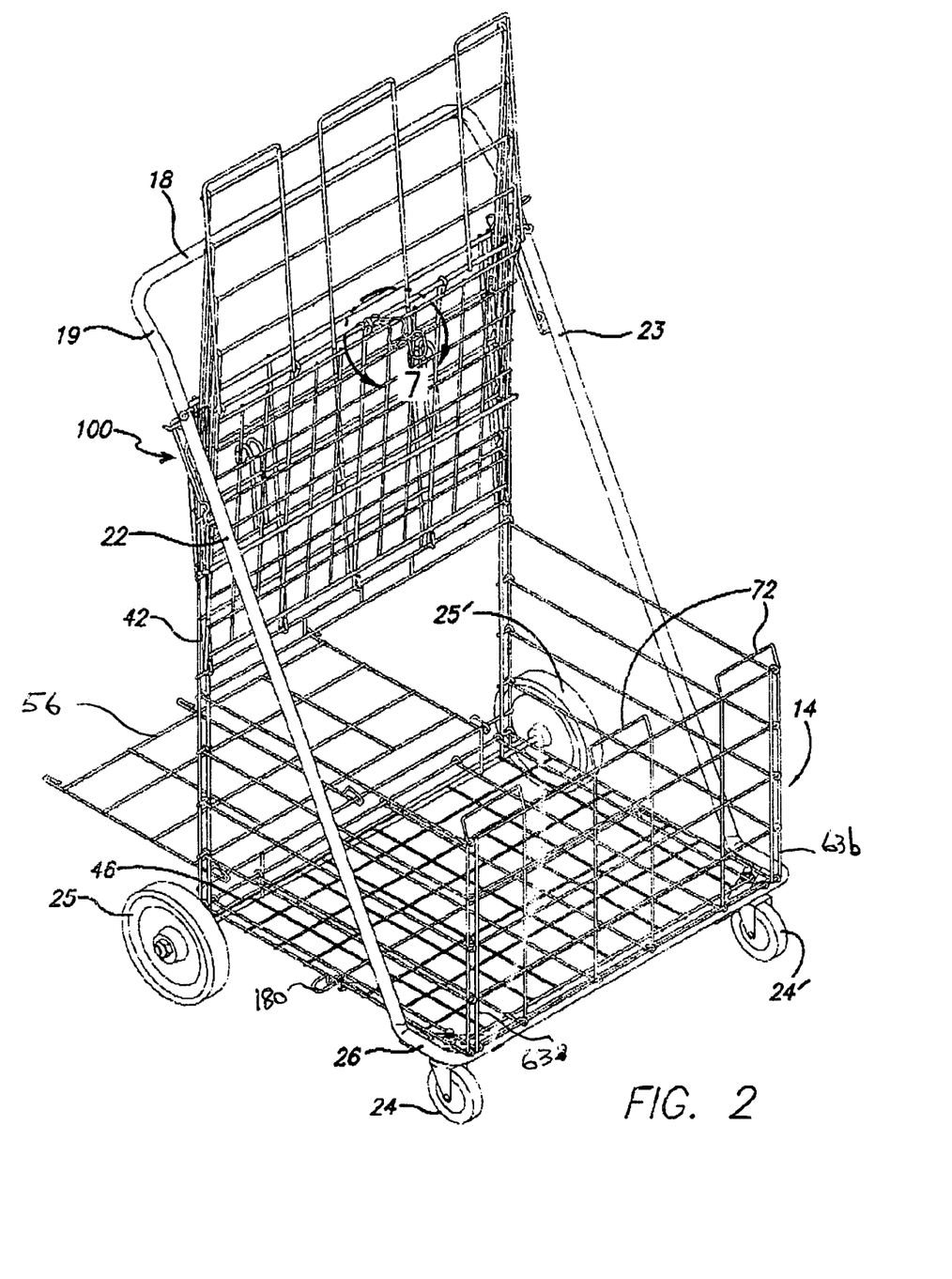
FIG. 2 is a rear perspective view of the personal shopping cart of the present invention, showing the rear access door 56 to the lower basket assembly.
Figure 3:
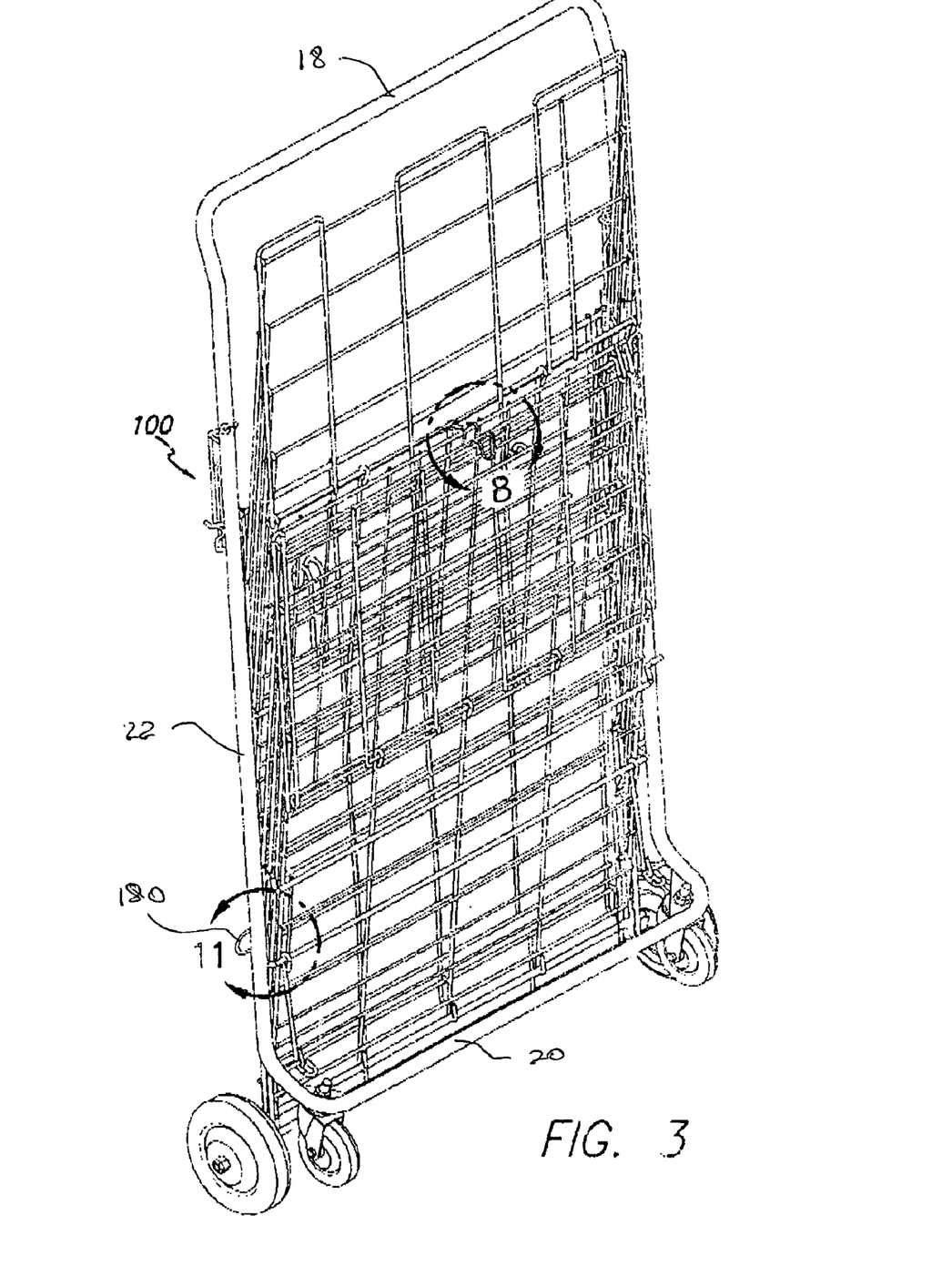
FIG. 3 is a front perspective view of the personal shopping cart of the present invention showing the cart in a fully collapsed, state.

Referring now to the drawings, and specifically first to FIG. 1, the personal cart 10 of the present invention, shown in a functional opened position, is seen to include an upper container or basket assembly 12 and a lower container or basket assembly 14. The upper basket assembly 12 is disposed atop the lower basket assembly 14, and the basket assemblies are capable of being pivoted from the fully opened, functional position shown in FIG. 1 to a partially opened functional position (as shown in FIG. 2) or a fully closed non-functional position (as shown in FIG. 3).

A handle 16 includes an upper handle portion 18, a lower handle portion 20, and side portions 22, 23 extending between and interconnecting the upper and lower handle portions. Preferably, the side portions 22, 23 are disposed on the exterior of the upper basket assembly 12 and the lower basket assembly 14. Preferably, the upper handle portion 18 and the lower handle portion 20 are both U-shaped, with the upper handle portion 18 being located atop and rearwardly of the cart, and the lower handle portion 20 being located at the lower region of the front of the cart. The U-shaped upper handle portion includes arms 19 which extend from the bight of the upper handle portion downwardly and forwardly to interconnect with the upper portions of the side portions 22, 23. The U-shaped lower handle portion 20 includes arms 21 that extend rearwardly and preferably horizontally from the bight of the lower handle portion 20 outside of the lower basket assembly 14 to interconnect with the lower portions of the respective side portions 22, 23 at the forward region of the cart. Casters 24, 24' are supported at the underside of the lower handle portion 20 at and below the intersection of the forwardmost portion of each of the arms 21 of the lower handle portion and the lateral extremities of the bight portion of the lower handle portion. The casters may be mounted directly to the lower handle portion as shown in FIG. 3, or they may be mounted to reinforcement plates (not shown) fixedly secured to the underside of the lower handle portion. Further, the casters on the front of the cart are preferably swivel casters (as shown in FIGS. 1 and 3) or they may be fixed, non-swiveling, casters. Casters 25, 25' (see FIG. 2) are supported on an axle 46 carried by and mounted to the rear of the lower basket assembly.

In contrast to the personal utility carts disclosed in applicants' previously filed US applications (identified above), the personal utility carts of the present invention, upon opening from the fully non-functional collapsed position (shown in FIG. 3), positively locks in an open position so that the user never needs to manipulate some part (e.g., refer to the slide element and lock of applicants' prior inventions described in the aforementioned published pending applications) of the cart after opening the lower basket assembly to assure that the cart will not fold closed on the user unexpectedly.

Referring now to FIGS. 1 and 5A-5C, the positive locking mechanism for securing the cart in an opened non-collapsed position is shown to include a latch element 100 carried by the upper portion of each of the side portions 22, 23 of the handle assembly. Each respective latch element 100 is secured to the side portions 22, 23 of the handle, preferably in the vicinity of the upper handle portion arms 19, 19. Each of the latch elements 100 comprises a first guide portion 110 disposed beneath and substantially parallel to the side portions 22, 23 of the handle and a second, biased, keeper portion 120.

Figure 5A:
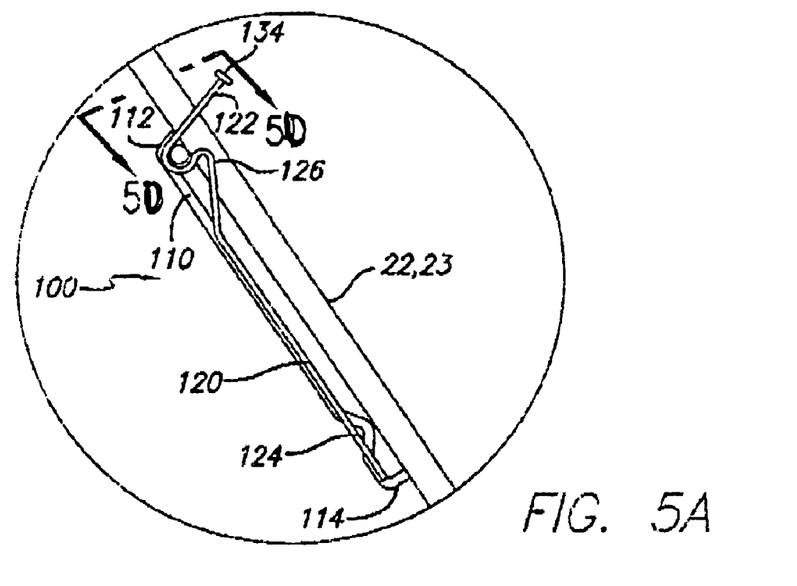
FIGS. 5a-5c are enlarged views of the section marked "5" in FIG. 1 which show details of the locking mechanism of the personal shopping cart of the invention.
Figure 5B:
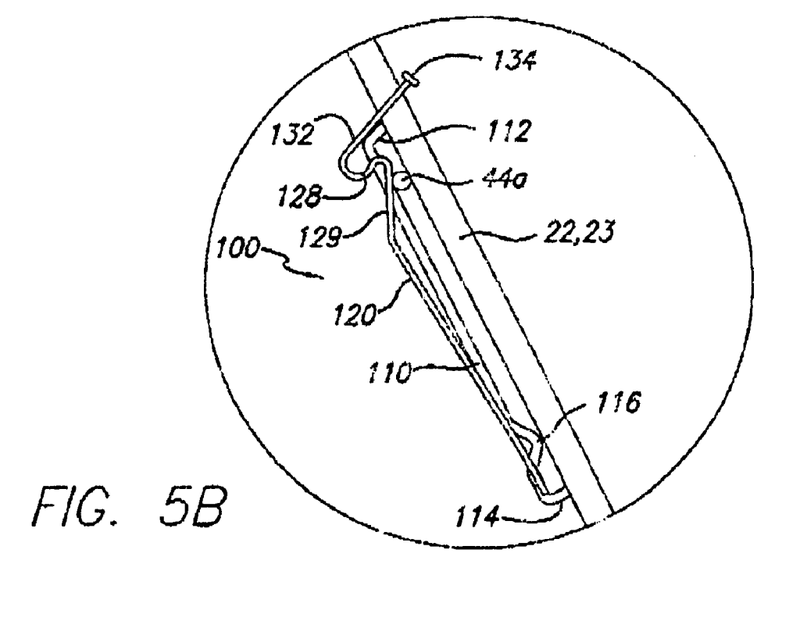
Figure 5C:
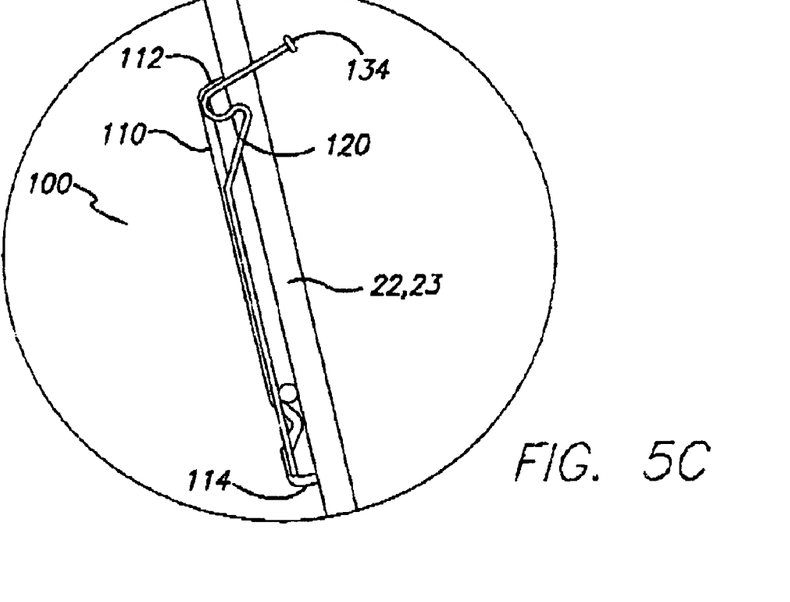

The guide portion 110 includes a first "upper" end 112 secured to the respective side portion 22 or 23, and a second "lower" end 114 secured to the respective side portion 22 or 23. Located between the first and second ends of the guide portion 110 at a location toward the bottom thereof (i.e., toward the second end 114) is a guide stop 116 formed by deforming the guide portion toward and into or nearly into engagement with the underside of the respective side portion.

The keeper portion 120 preferably comprises a slender elongated wire-like element having a first upper end 122 and a second lower end 124. The second end of the keeper portion is secured to the second end portion 114 of the guide element at a location below the side portion to which the latch element is affixed. The first end 122, which is not secured to the guide element and is free to move in a cantilevered fashion toward and away from the side portion of the handle assembly, includes a first segment 132 directed toward the side portion 22 or 23, and a second segment 134 that forms a nearly circular end which encircles and captures the side portions 22 or 23. Disposed between the first end 122 and the second end 124 of the keeper portion 120 is an inclined ramp portion 129 which extends upwardly and forwardly in a direction toward the respective side portion 22 or 23 and culminates in a forwardly directed detent portion 126. Further above the detent portion 126, but rearwardly thereof is a latch notch 128.

When a user opens the cart from its fully collapsed position (see FIG. 3), the upper horizontal wire element 44a of the rear panel of the cart rides from the position depicted in FIG. 5c, in which the wire element 44a is located at the guide stop 116, upwardly in the guide portion 110. First, the wire element 44a moves to the position shown in FIG. 5B, where the wire element 44a bears against and forces the keeper portion rearwardly by its engagement with the ramp portion 129. Then, as the wire element 44a continues upwardly in the guide portion 110, it passes over the detent portion 126 and is captured and held in the latching notch 128. Simultaneously, the lower basket assembly of the cart becomes fully deployed and opened. On the upper side of the ramp-like segment 128 is a latching notch 130 into which the wire element 44a seats following its passing over the upper extent of the ramp portion 126. It is to be noted as most clearly shown in FIGS. 5B and 5C that the latching notch is smaller in dimension between the first segment 132 of the keeper portion 120 and the upper extent of the ramp portion 126 than across the notch 130. This is for the purpose of positively retaining the wire element 44a in the latching notch 130 after the lower basket assembly of the cart has deployed to its fully opened position.

Figure 5D:
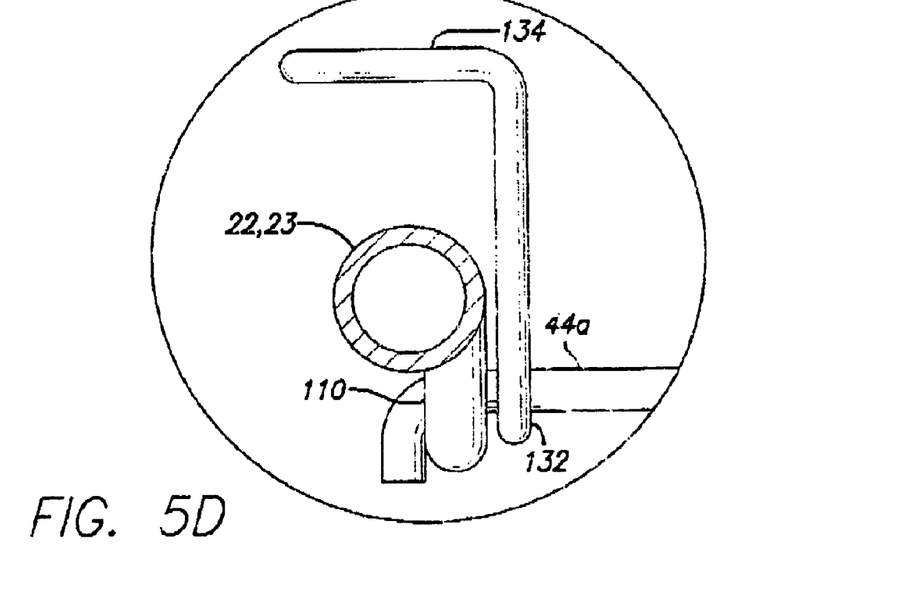
FIG. 5D is a top-down view of the latching mechanism for holding the cart in an fully opened position, the view being taken along lines 5D-5D in FIG. 5A.

Thus, when the basket is opened from its fully collapsed position (FIG. 3), the lateral ends of the wire element 44a in the rear panel of the cart move from the position shown in FIG. 5C upwardly in the guide portion 110 toward the "upper" end of the guide portion 110 until they engage the inclined ramp portion 129, whereupon further opening of the cart causes the ends of the wire elements 44a to push the ramp portion 129 rearwardly until the wire elements 44a ride over and engage in the latching notch portion 130 whereupon the keeper portion 120 springs forwardly to return to its original position, and the ends of the wire elements 44a are securely retained in the latching notch portion 130. The free end 134 of each keeper member is prevented from disengaging from the side portion of the cart due to its being formed in a nearly closed loop which encircles the side portion 22, 23 of the handle member (see FIG. 5D). In this manner, the ends of the upper wire 44a are kept from moving relative to the side member on which it is supported when the cart has been opened, thereby locking the cart in a fully opened position and preventing accidental closure of the cart when the cart contains goods.

To release the wire elements 44a of the rear panel portion from the latching mechanism 100 so that the lower basket assembly can be collapsed and the cart rendered non-functional, it is necessary to move the keeper portion 120 rearwardly a sufficient distance so that the wire elements 44a can be disengaged from the latching notch 130 and moved downwardly in the guide portion 110. This can be accomplished by pressing rearward, on each side of the cart, the second segment 134 of the free upper end portion 122 of the keeper portion. This releases the wire element 44a from the latching notch 130, allowing the wire element to move downwardly in the guide portion 110 as the lower basket assembly is pivoted into a fully collapsed position. Although not shown in the drawings, the invention contemplates a single operator that can effect movement of both of the keeper portions 120 rearward and at the same time. This could be accomplished, for example, by securing the two keeper portions on opposite sides of the cart together by a single horizontal member, which would allow a cart user to grasp the single member and pull back thereby simultaneously releasing both of the keeper portions.

As seen in FIGS. 1 and 2, the wire 44*a* spans the distance between, and is supported by the two latch elements 100. A pair of spaced apart, parallel, substantially vertical support members 42, 43 extend downwardly from each lateral region of the elongated member 44*a* in the vicinity of the latch elements 100. Each support member is associated with a respective one of the latch elements. The length of the support members 42, 43 is preferably chosen to be greater than the combined height of the upper and lower basket assemblies 12, 14. A plurality of other horizontal support elements 44*b*, 44*c*, . . . extend parallel to one another and between the support members 42, 43 at vertically spaced locations downwardly to just below the rearwardly extending horizontal arms 21, 21 of the lower handle member 20. Similarly, several vertically disposed, spaced apart, and parallel slender elements 45*a*, 45*b*, 45*c* are provided for supporting engagement with the horizontal support elements 44*a*, 44*b*, . . . The horizontal support elements 44*a*, 44*b*, . . . form, along with the support members 42, 43, a grillwork or latticework panel, which functions as the rear panel, for the upper and lower basket assemblies 12, 14. An axle member 46 is supported by the lowermost portion of the vertical support elements 42, 43, located preferably below the plane of the floor panel of the lower basket assembly 14. The axle member 46 extends laterally between the support members 42, 43 and carries casters 25 on end portions of the axle member 46.

Vertical support members 62 and 63 are provided at the front of the upper and the lower basket assemblies at opposing sides of the basket assemblies.

Each of the upper and lower basket assemblies comprise front, side, and bottom panels. Preferably, each of the front and bottom panels comprise a grillwork or latticework of slender elongated elements (such as the wires shown in the Figures, or thin rods; however, the present invention also contemplates forming the panels from solid sheets of material with wires or pin-like projections extending from the front and rear of the side panels so as to form a structure similar to the side panels shown in the Figures of the drawings). The slender elements 47 of the side panels of the basket assemblies extend from front to rear, and are attached to the front and rear panels of the upper and lower basket assemblies of the cart. When either the top or bottom basket assembly is in an erected state (as shown in FIG. 1), the slender elements are parallel to one another and arranged substantially horizontally. The ends of each slender element 47 in each of the side panels of the upper and lower baskets are formed into loop (as are the front and rear end of each element of the upper and lower basket assembly floor panels) which, at the rear end thereof, is hooked about and pivotable on a horizontal element in the rear panel extending laterally between the support elements 42, 43, and at the forward end thereof is hooked about and pivotable on horizontal elements 52 of the front panel extending laterally between the support elements 42, 43. The pivoting connections function in such a manner that, after the cart has been opened as shown in FIG. 1, the basket assemblies are permitted to pivot upwardly and rearwardly about the horizontal elements 44*a*, 44*b*, 44*c* . . . and thereby effect collapse of the basket assemblies, either the upper basket assembly alone to achieve a partially collapsed state (as shown in FIG. 2), or the two basket assemblies together to achieve a fully collapsed state (as shown in FIG. 3).

Each of the upper and lower basket assemblies are independently able to be pivoted upwardly and rearwardly. This can be done simultaneously to effect collapse of the two basket assembies together by grasping the lower front portion of the lower basket assembly and lifting it upwards and to the rear, which in turn forces the upper basket assembly to be lifted upward and to the rear, so that both basket assemblies can be collapsed at the same time.

Figures 6, 7, 8:
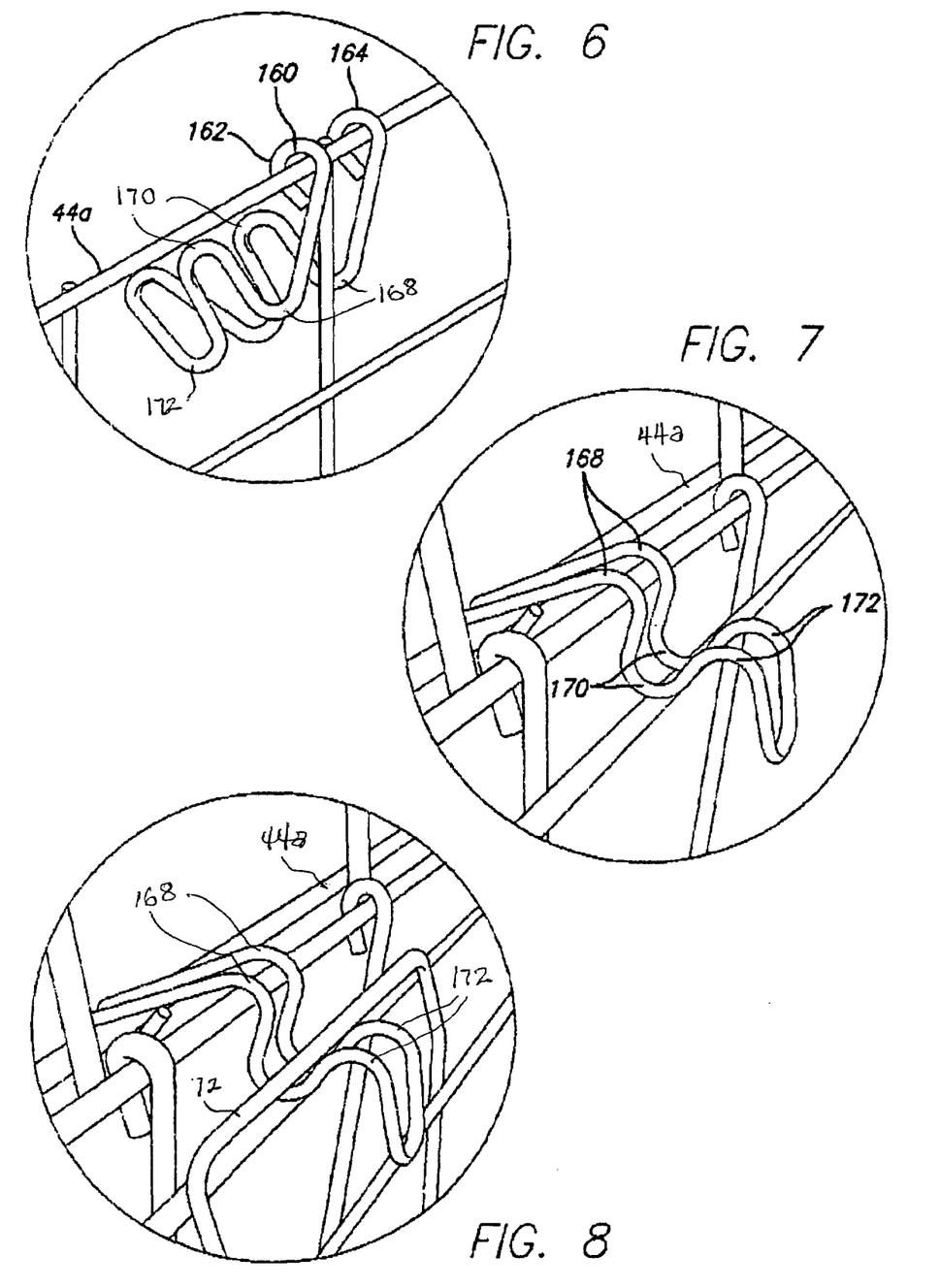
FIG. 6 is a close-up view, taken at the circled area in FIG. 1 identified with the designation "6", of a basket assembly retaining mechanism for securing the upper and the lower basket assemblies of the cart when the upper or the upper and lower basket assemblies are in their non-functional positions.
FIG. 7 is a close-up view, taken at the circled area in FIG. 2 identified with the designation "7", of a basket assembly retaining mechanism for securing the upper and the lower basket assemblies of the cart when the upper or the upper and lower basket assemblies are in their non-functional positions.
FIG. 8 is a dose-up view, taken at the circled area in FIG. 3 identified with the designation "8", of a basket assembly retaining mechanism for securing the upper and the lower basket assemblies of the cart when the upper or the upper and lower basket assemblies are in their non-functional positions.

Alternatively, the lower basket assembly alone can be lifted upward and rearward so as to be collapsed, as shown in FIG. 2. In this latter semi-collapsed state, the upper basket can be secured in its collapsed position by means of a latching clip 160 shown in FIGS. 1 and 2, and in detail in FIGS. 6-8 (description of the latching clip 160 is set out in detail below). It is to be noted that the lower basket assembly cannot be collapsed separately from, or before collapse of, the upper basket assembly—if the lower basket assembly is to be collapsed, it is necessary to also collapse the upper basket assembly.

The rear panel of the cart assumes a substantially vertical orientation when the cart has been fully opened and is seated on the ground on its four casters. The rear panel includes a pair of spaced apart hook elements 53, 54 located on the upper panel portion U to permit suspension of the cart, when completely collapsed, from a structural support (not shown), such as the upper front rail of a conventional shopping cart, a horizontally extending suspension member, suspension elements secured to a wall, etc.

The lower portion of the rear panel may preferably be provided with a downwardly and rearwardly pivoting panel or door 56 (see FIG. 2) to permit access to the contents in the lower basket assembly when the upper basket assembly is still in its open, fully functional, position.

Indicia bearing signs, such as those shown in applicants' prior pending applications but not shown here, can be attached to the front panel portions of the upper and lower basket assemblies. Preferably, the signs are held in sign frames, such as frame 212 seen in the Figures of applicants' prior pending applications, which can be of square, rectangular, or any other configuration. The sign frame 212 is to be secured to the front panel of the upper basket assembly for holding a sign or a tag that identifies a product or service provider whose products or services are offered in markets. Further as shown in applicants' prior pending applications, signs can be attached to the front panel of the lower basket assembly for identifying the owner of the cart and the store from which the cart was purchased.

The present invention contemplates a method for deterring theft of "conventional" shopping carts which entails the sale of personal carts of a type similar to those described herein to customers by the markets or by third party cart vendors (as for example, vendors who can sell the carts directly to the customer either in the markets or through separate storefronts).

The vendors of services or goods will pay the market a fee for the market to supply vendor product advertising or event promotions or other advertising on a tag or card held in the sign frame on the customer's personal cart. The market's vendors then supplies to the customers discount or rebate coupons for vendor supplies or services currently available in or at the market, for future purchases of vendor supplies or services, or for promotional give-aways. In a reasonably short period of time, the discounts or rebates given to the customer via the coupons will add up to the cost of the cart, and all discounts or rebates thereafter made available to the customer run toward developing an increasing "value" component attributable to ownership of the cart.

Moreover, by making such personal carts available for purchase to the customer, the markets can reduce their own in-store inventories of conventional shopping carts. And now, with recent state and municipal legislation being passed or at least being considered for the imposition of fines on markets whose carts are not maintained at the premises of the markets, a program such as the one outlined above would not only result in fewer carts being removed from the market's premises by customers, but also an improvement in the appearance of the surrounding community.

Figures 9, 10, 11:
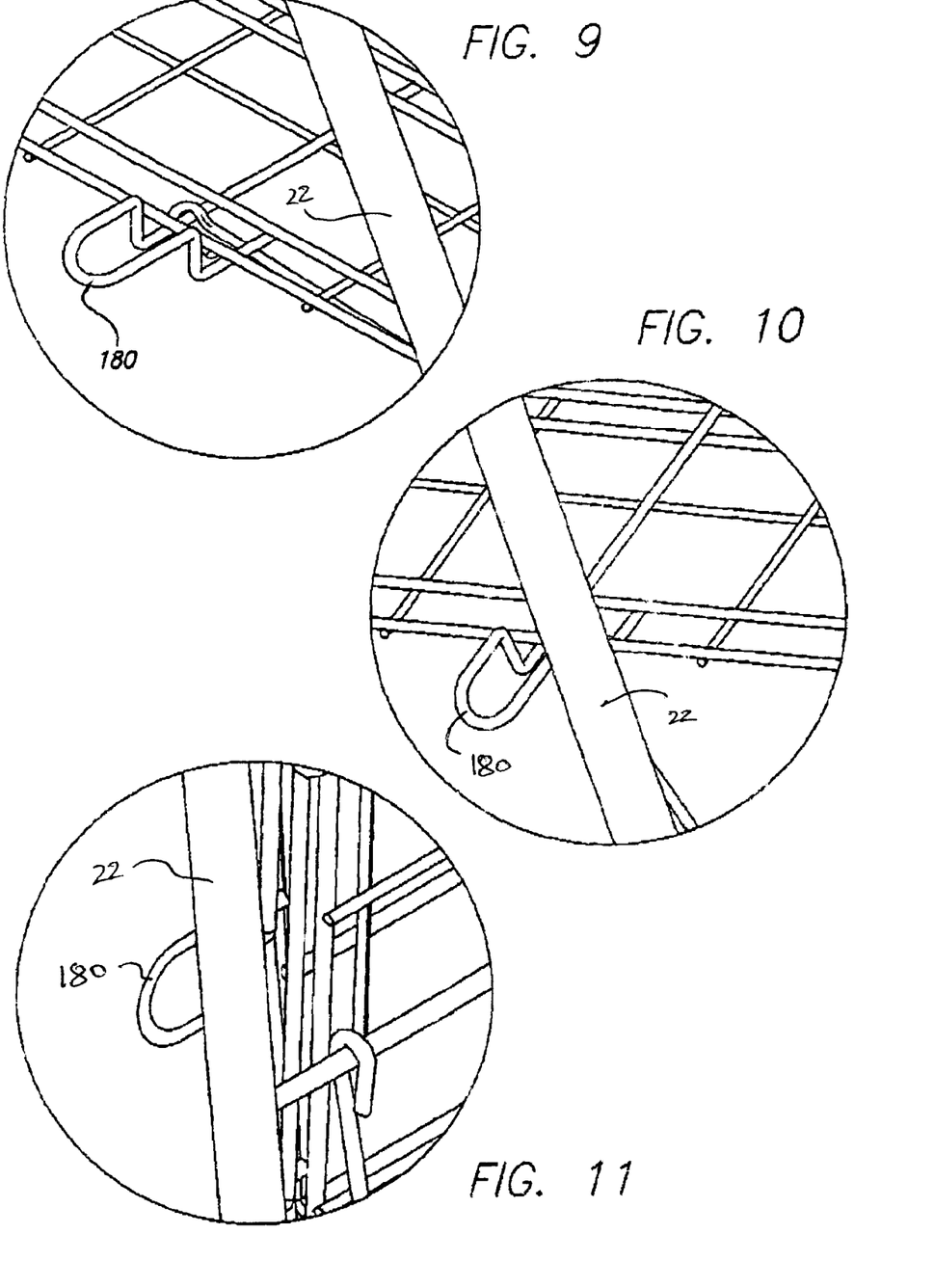
FIGS. 9-11 show stages of operation of a guide element used when the shopping cart of the present invention is opened or closed.

Referring now to FIGS. 1 and 68, a basket latching element 160 is provided on the upper horizontal element 44*a* of the rear panel. The element 160 comprises a single length of wire bent in half upon itself and includes free ends 162, 164 that are formed into loops. The loops are pivotably engaged about with the upper horizontal element 44*a* of the rear panel so that the securing element can freely swing from the element 44*a* when not in use. Each of the two loops of the element 160 has an elongated end portion that extends away from its respective loop and each end portion is formed with a first U-shaped bend 168, a second U-shaped bend 170, and a third U-shaped bend 172. Each of the first and second bends serve a unique basket latching function for holding the upper basket, or the upper and lower baskets, in a collapsed position. The third bend functions as a handle to facilitate a user manipulating the element into a desired position to secure the upper basket, or the upper and lower baskets, in a collapsed position. FIG. 9 shows the element 160 being used to secure the upper basket when it is in a collapsed position, while FIG. 10 shows the element 160 being used to secure both the upper and the lower baskets in their collapsed positions.

In using the element 160 to secure the upper basket assembly in its collapsed position, the first bend 168 is pressed into engagement with a horizontal element in the bottom panel of the upper basket assembly when the upper basket assembly only is pivoted into a collapsed position as shown in FIG. 2. When the cart is in this partially collapsed position, goods contained in the lower basket assembly can be accessed. The cart can also be used with the upper basket assembly in a collapsed and secured position when the customer's purchased goods in the lower basket assembly are taller than the height of the lower basket assembly.

When using the element 160 to secure both the upper basket assembly and the lower basket assembly in their collapsed positions (see FIG. 3), the first bend 168 is pressed into engagement with a horizontal element in the bottom panel of the upper basket assembly and the second bend 170 is engaged with a horizontal element in the front panel of the lower basket.

FIGS. 9-11 are dose-up views of a guide member 180 that is incorporated into one side of the lower basket bottom panel. As shown in the Figures, the guide member 180 comprises a U-shaped extension of one of the laterally extending wire elements of which the bottom panel of the lower basket is formed. The guide member 180 projects outwardly of the perimeter of the lower basket bottom panel. The purpose of the guide member 180 is to keep the side wires of the lower basket within the side members 22, 23 of the cart when the lower basket assembly is collapsed (i.e., when the upper basket assembly and the lower basket assembly is fully collapsed). Thus, as a user of the cart pivots the upper and lower basket assemblies into a fully collapsed state, the guide member 180 moves from a first position where it is completely out of engagement with the side arms 22, 23 (FIG. 9) to a second position where it first makes contact with the side arms 22, 23 (FIG. 10), and then to a third position when the cart is fully collapsed (FIG. 11). In moving from the first position to the third position, the guide member 180 functions to keep the basket assemblies between, and within the space between, the side arms of the cart.

Figure 4A:
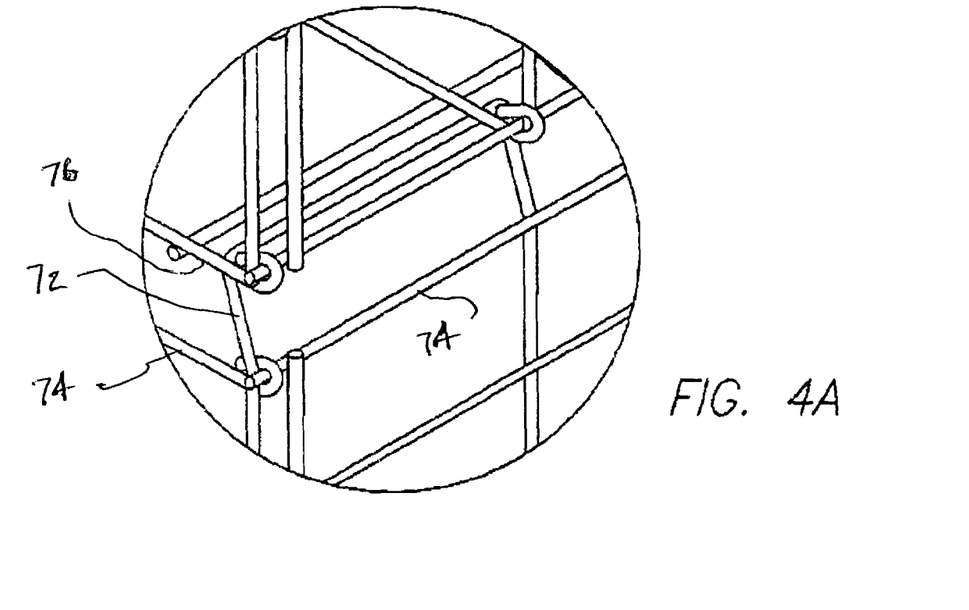
FIG. 4a is an enlarged perspective view of the section marked "4" in FIG. 1 showing the structure and manner in which the upper basket assembly is supported on the lower basket assembly.
Figure 4B:
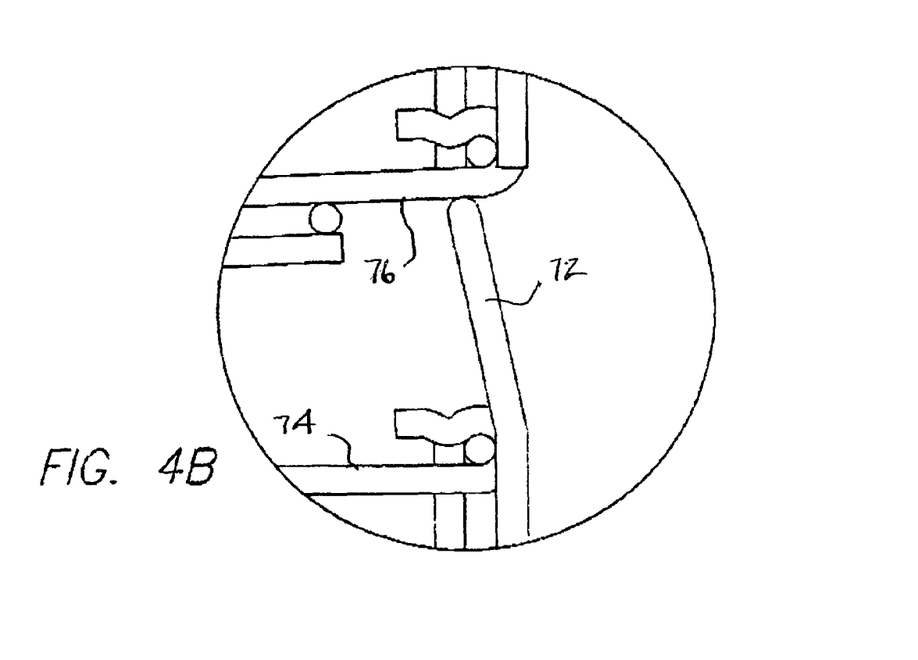
FIG. 4b is an enlarged side view of the section marked "4" in FIG. 1 showing the structure and manner in which the upper basket assembly is supported on the lower basket assembly.

FIGS. 4A and 4B show U-shaped wire support members 72 formed as extensions of selected adjacent pairs of the vertical wire elements in the front panel of the lower basket assembly. The wire support members 72 extend above the upper "rim" 74 of the lower basket assembly, and function to support the underside 76 of the front portion of the upper basket assembly when the latter is seated atop the lower basket assembly.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What we claim is:

1. A multi-level personal utility cart, comprising:
a frame including a vertical rear panel and a handle having an upper portion, side portions, and a forwardly extending lower portion, and latching structure located on said handle side portions, each said latching structure being biased toward, and structurally engaged with, a portion of said rear panel,
a lower basket assembly carried by and pivotably attached to said frame and being selectively usable as an opened container,
an upper basket assembly disposed atop the lower basket assembly and carried by and pivotably attached to said frame, said upper basket assembly being usable as an opened container, and
said upper and lower basket assemblies being pivotable on said frame in a direction toward said handle upper portion so that said upper and lower basket assemblies can be collapsed against a portion of said frame into a compact and substantially planar structure,
said latching structure on said handle side portions operatively engaging said portions of said rear panel to automatically lock said cart in an opened position, each said latching structure further comprising a guide portion for constraining motion of the rear panel portions between a locking position and non-locking positions, and a biased keeper for securing said rear panel portions in said locking position when said cart is opened from its fully collapsed position, said keeper being cantilevered, and said locking position comprising a latching notch.

2. The multi-level personal utility cart of claim 1, wherein said portion of said rear panel with which said latching structure is structurally engaged comprises wire elements extending laterally from said rear panel.

3. The multi-level personal utility cart of claim 1, wherein said latching structure on said handle portions are identical.

4. The multi-level personal utility cart of claim 1, wherein said lower basket assembly is supported on said lower portion of said handle.

5. The multi-level personal utility cart of claim 1, wherein said upper basket assembly is collapsible independently of said lower basket assembly such that the interior of said lower basket assembly can be accessed independently of the interior of said upper basket assembly.

6. The multi-level personal utility cart of claim 1, wherein said handle includes U-shaped segments at the upper and lower portions thereof, said U-shaped segments connecting opposing sides of said handle, and further including a guide member on the bottom panel of the lower basket assembly, said guide member protruding laterally outwardly and engaging the side portions of said handle during collapse of said lower basket assembly.

7. The multi-level personal utility cart of claim 1, wherein said frame includes a grillwork backbone and vertically extending, parallel support members, said backbone extending laterally between said support members and forming the rear panel for each of said upper and lower basket assemblies.

8. The multi-level personal utility cart of claim 1, wherein said frame includes parallel hook members on a portion thereof for suspending the cart when the cart is collapsed.

9. The multi-level personal utility cart of claim 1, and further including a latching clip secured to said rear panel for securing the lower basket assembly and/or the upper basket assembly in a collapsed position, wherein said upper and lower basket assemblies are comprised of wire grillwork.

10. The multi-level personal utility cart of claim 1, and further including wheels supported on said lower handle portion.

11. The multi-level personal utility cart of claim 10, wherein said wheels are swivel wheels and are spaced apart from one another.

12. The multi-level personal utility cart of claim 1, wherein said keeper includes a ramp portion adjacent said latching notch against which said rear panel portion rides to urge said keeper rearward to allow said rear panel portion to positively engage said latching notch and thereby lock said cart in an opened position.

13. The multi-level personal utility cart of claim 12, wherein said keeper is secured to said guide portion.

14. The multi-level personal utility cart of claim 1, wherein said frame includes a pivoting door associated with said rear panel and said lower basket assembly for accessing the interior of said first lower assembly when the upper basket assembly is disposed atop the lower basket assembly.

15. The multi-level personal utility cart of claim 14, wherein said frame further includes a vertical support member depending from said handle portion, and a second set of wheels supported on said support member, wherein said door is pivotably supported by said vertical support member.

16. The multi-level personal utility cart of claim 15, wherein said lower basket assembly includes support members for supporting the upper basket assembly thereon when said upper basket assembly is pivoted from a non-functional position to a fully functional position, so that the underside of said upper basket assembly is supported on the lower basket assembly support members.

17. The multi-level personal utility cart of claim 16, wherein said support members are carried by, and extend above the upper edge of, the front panel of the lower basket assembly.

18. The multi-level personal utility cart of claim 1, wherein said upper and lower basket assemblies each includes panels at the front, sides, and bottom thereof, said upper basket assembly further being supported by said lower basket assembly.

19. The multi-level personal utility cart of claim 18, and further including at least one element projecting upwardly above the upper perimeter of the lower basket assembly on which said upper basket assembly is supported, said at least one element being associated with the front panel of said lower basket assembly.

20. The multi-level personal utility cart of claim 18, wherein said front, side and bottom panels of upper and lower basket assemblies are substantially planar elements.

21. The multi-level personal utility cart of claim 20, wherein said substantially planar elements are comprised of wires in a grillwork configuration.

* * * * *